United States Patent [19]

Luke

[11] Patent Number: 6,077,441

[45] Date of Patent: Jun. 20, 2000

[54] MINERAL RECOVERY PROCESSES

[75] Inventor: Donald Allen Luke, Valrico, Fla.

[73] Assignee: Ciba Specialty Chemicals Water Treatments Limited, West Yorkshire, United Kingdom

[21] Appl. No.: 09/229,545

[22] Filed: Jan. 13, 1999

Related U.S. Application Data

[60] Provisional application No. 60/071,118, Jan. 13, 1998.

[51] Int. Cl.$^7$ ..................................................... B01D 21/01
[52] U.S. Cl. ......................... 210/712; 210/734; 210/747; 210/907
[58] Field of Search ..................................... 210/734, 907, 210/747, 712, 768; 209/5, 162, 902; 166/265; 405/52

[56] References Cited

U.S. PATENT DOCUMENTS

| | | | |
|---|---|---|---|
| 1,446,185 | 2/1923 | Horst . | |
| 3,418,237 | 12/1968 | Booth et al. | 210/54 |
| 3,622,087 | 11/1971 | Oltmann | 241/62 |
| 3,680,698 | 8/1972 | Liu et al. | 210/714 |
| 3,707,523 | 12/1972 | Ledden et al. | 260/41 |
| 4,194,969 | 3/1980 | Chung et al. | 209/5 |
| 4,224,149 | 9/1980 | Balcerski et al. | 210/705 |
| 4,251,363 | 2/1981 | Chamberlain et al. | 210/727 |
| 4,265,770 | 5/1981 | Thomas | 210/715 |
| 4,342,653 | 8/1982 | Halverson | 210/734 |
| 4,555,346 | 11/1985 | Rosen et al. | 210/734 |
| 4,690,752 | 9/1987 | Shaw | 209/5 |
| 5,688,404 | 11/1997 | Luke et al. | 210/734 |

*Primary Examiner*—David A. Simmons
*Assistant Examiner*—Frank M. Lawrence
*Attorney, Agent, or Firm*—David R. Crichton

[57] ABSTRACT

The aqueous clay waste formed during a phosphate or other mineral recovery processes is flocculated in a well which is generally formed in a sedimentation lagoon, the supernatant is taken from the top of well and is recycled to the main flotation or other separation process (generally after running across sediment in the lagoon) and the thickened sediment which is formed in the well is pumped from the base of the well to one or more final lagoons where it is converted to a solid sediment by sedimentation and evaporation.

13 Claims, No Drawings

MINERAL RECOVERY PROCESSES

This application claims the benefit under 35 U.S.C. 119(e) of U.S. Provisional Application Ser. No. 60/071,118, Filed Jan. 13, 1998.

BACKGROUND OF THE INVENTION

This invention relates to mineral recovery processes which comprise a main separation stage and a waste sedimentation stage.

In the main separation stage the mineral, for instance phosphate clay, is slurried with water and is separated into an enriched fraction and a dilute aqueous clay waste. This separation stage may involve one or more separation processes and may involve recycling of enriched material for further separation.

The waste sedimentation stage involves sedimenting and evaporating the dilute aqueous clay waste in one or more settling lagoons to provide a substantially solid clay sediment and supernatant. The supernatant is recycled in order to provide as much as is reasonably possible of the water which is to be used in the main separation stage. If the aqueous clay waste contains valuable mineral, the waste may be subjected to treatments to allow recovery of this mineral before the final sedimentation of the clay.

The aqueous clay wastes formed in phosphate recovery and other such processes are sometimes referred to as slimes and are subjected to lagoon sedimentation because they are not susceptible to normal dewatering processes but, instead, settle only very slowly.

There have been numerous proposals in the literature to try to accelerate the sedimentation by flocculating the clay waste, and there have been proposals to improve the structure of the substantially solid clay sediment by adding sands or other materials to the clay waste. Examples of disclosures of such mineral recovery processes utilizing flocculants are U.S. Pat. Nos. 3,418,237, 3,622,087, 3,707,523, 4,194,969, 4,224,149, 4,251,363, 4,265,770, 4,342,653, 4,555,346, 4,690,752, 1,446,185 and 5,688,404, which are each incorporated herein by reference.

Despite the numerous proposals to use flocculants, in practice it has been found that their use frequently is not cost effective. Even when flocculant is used to promote sedimentation and the provision of a supernatant which can be recycled, the quality of the supernatant tends to be rather poor because the supernatant tends to be contaminated with unflocculated clay particles.

In particular, the main separation stage often includes the use of treatment chemicals such as flocculation agents or, especially, flotation agents and the efficiency of their use is decreased (and thus the required dosages are increased) when the water which is used in the flotation or other procedures during the separation stage contains suspended clay particles.

In order to minimize contamination and lack of clarity of the supernatant, it would be desirable to conduct the sedimentation under conditions which provide a considerable depth of sedimenting waste, so as to allow for a deep layer of supernatant above the sediment, thereby permitting supernatant to be drawn off at a height which is as far above the lower sedimented material as is possible. Unfortunately it is difficult to provide for this in lagoons as they tend normally to be relatively shallow. In particular, the problem becomes more acute as the lagoons become filled, over the years, with an increasing depth of substantially solid clay sediment.

A further problem arises from the fact that it is necessary to make optimum use of lagoon areas because of the undesirability of creating new lagoons. Accordingly there is an increasing tendency to need to continue using lagoons until it is impossible to deposit any more solid clay sediment in them, and so there is an increasing tendency to want to use lagoons which are substantially full and are too shallow for useful sedimentation. There is an increasing need to utilize lagoon areas more efficiently.

It is of course known in other processes to utilize sedimentation columns, for instance tubular metal tanks, which are constructed above ground level. Provided such a column has sufficient height it will eventually allow for the formation of a useful depth of supernatant. Unfortunately the volume of aqueous clay wastes which are generated in phosphate and other mineral recovery processes can be so large that it is impracticable even to contemplate the provision of column separating tanks of this type.

It is also, of course, well known to extend the life of a lagoon by digging the solid clay sediment out of it, but this is labor intensive and does not provide any direct solution to the need to conduct the recovery process efficiently and to give a good quality supernatant.

OBJECT OF THE INVENTION

The object of the invention is to provide a phosphate or other mineral recovery process by which it is possible to obtain supernatant for flotation or other separation steps of improved quality, and by which it is possible to utilize sedimentation lagoons more efficiently.

SUMMARY OF THE INVENTION

A mineral recovery process according to the invention comprises a main separation stage in which mineral is slurried with water and separated into an enriched fraction and a dilute aqueous clay waste, and a waste sedimentation stage in which the dilute aqueous clay waste is sedimented in one or more settling lagoons to provide a substantially solid clay sediment and supernatant and the supernatant is recycled to the main separation stage, and the waste sedimentation stage comprises feeding the dilute aqueous clay waste into a well which has been formed in the ground, flocculating the dilute aqueous waste in the well by mixing polymeric flocculant into the waste, sedimenting the flocculated waste in the well to provide a pumpable thickened clay sediment and a supernatant, recycling the supernatant from the well back to the main separation stage, pumping the thickened clay sediment from beneath the supernatant in the well to one or more final lagoons and allowing the thickened clay sediment to undergo further sedimentation to provide a substantially solid clay sediment in the one or more final lagoons.

DESCRIPTION OF THE PREFERRED EMBODIMENTS

In general, the invention is applicable to any process in which the separation of mineral values from the raw mined rock or other material comprises slurring with water and thereby producing large volumes of a diluted aqueous clay waste which is then subjected to sedimentation in lagoons. Generally the clay waste has the characteristic of a slime.

The preferred mineral recovery process to which the invention is applied is the recovery of phosphate values from phosphate clay, for instance as is practiced in the phosphate recovery processes in Florida. Other mineral recovery processes to which the invention may be applied include any of those where the natural settling rate of the sediment is sufficiently slow that lagoon settlement is appropriate and where the settling can be promoted by a flocculating agent.

When the process is phosphate recovery process, the main separation stage can involve any of the conventional separation procedures in such processes. For instance it may involve cycloning the slurry and may involve subjecting the slurry to flotation. Frequently the material may be recycled one or more times through one or more separation procedures.

The invention is of particular value when the separation stage includes a flotation process. The flotation process is promoted by the addition of flotation chemicals such as flotation collectors or flotation depressants and such chemicals may be supplied to the flotation stage together with recycled supernatant. A solution of the flotation chemical in the recycled supernatant may be used for forming the mineral slurry. The recycled supernatant may be used alternatively or additionally for rinsing, transport, flotation of the suspension or any other useful process.

Irrespective of how the supernatant is used, the dosage of flotation chemical which is required tends to increase significantly as the clarity of the supernatant decreases. For instance, the amount of flotation aid which is required in any particular process is very much greater if the recycled supernatant has low clarity than if the supernatant has exceptionally good clarity. By the invention it is possible to obtain exceptionally good clarity thus it is possible to reduce significantly the amount of amine or other flotation aids which are utilized.

The dilute aqueous clay waste is a slurry consisting primarily of waste clay slime particles in water. However the clay slurry or waste may contain some useful course mineral values. The waste may be primary clay separation waste, typically having a 5% solids content and containing some useful mineral value, or a secondary clay separation waste typically having a lower solids content and less coarse material in it. In particular, the clay slurry or waste will often consist of or contain a secondary clay waste, namely a waste obtained from a flotation or other separation process. In some processes, the primary and secondary clay wastes are treated separately while in other processes the primary and secondary clay wastes are mixed together.

In general, the dilute aqueous clay waste generally contains not more than 7% and usually not more than 5% total solids by weight, but usually contains at least 0.1% and usually at least 0.5% by weight total solids. The solids generally consist wholly or mainly of clay fines but can include some coarser clay waste or some coarser mineral values, such that the coarser material can be sedimented from the clay while the fines remain in suspension. The clay fines usually constitute at least 50% and usually at least 90% or at least 99% by weight of the dry matter of the waste. The clay fines, which constitute the majority of the dry matter, will have physical and chemical characteristics typical of clay slimes and, in particular, these characteristics are such that lagoon settlement and evaporation is usually the only practical way for converting the fines into a substantially solid sediment.

If the dilute aqueous clay waste contains coarse mineral values or other coarse settleable material, these materials may be sedimented from the waste as it flows through a ditch towards the well (for instance as described in U.S. Pat. No. 5,688,404) or these values may be sedimented in a lagoon prior to the well treatment of the present invention. Thus the waste containing the mineral values may be directed into an entry area of a settling lagoon, and the resulting reduction in flow velocity which occurs as the waste enters the lagoon causes sedimentation of the mineral values primarily in the entry area. The mineral values can then be recovered from the base of the entry area, or if appropriate from the base of the entire lagoon by excavation.

The dilute aqueous clay waste, optionally after preliminary sedimentation of coarse materials, then flows into a well that has been formed in the ground. The well can be located within or in the vicinity of a primary lagoon, existing mine cuts, a channel, an emergency spillway or secondary containment area or virgin territory. In a preferred embodiment, the well is located in a primary lagoon, more particularly at the base or waste entrance of a primary lagoon. The well may be made by excavation of, for example, a square, rectangle, circle or oval area in the ground to a sufficient depth. If desired the well can be lined in order to prevent erosion of the walls, but this is usually unnecessary.

As a result of utilizing a well, instead of a settlement column, it is possible to generate a very large volume and deep settlement zone very cost effectively. A supernatant layer and a thickened sediment layer are formed within the well from the dilute aqueous waste layer fed into the well. The supernatant can be removed, pumped or otherwise drawn from the top of the well provided this removal does not disturb the thickened sediment layer at the bottom of the well. Generally the supernatant is taken from the well by overflowing the well during substantially continuous feed into the well. The removal of the supernatant can be in any convenient manner, for instance through a channel and piped back to the separation stage, in which event the well can be dug in any suitable location.

As described above, a preferred embodiment provides that the well is dug at the base of a primary lagoon and the supernatant overflows from the top of the well and flows across the exposed base of the primary lagoon. Generally the primary lagoon would have been used already for collecting solid clay sediment from the mineral recovery process and so the supernatant flows over the substantially solid clay sediment in the primary lagoon.

The flow of the supernatant from the well over the sediment before recycling of the supernatant to the main separation stage has the effect of polishing the supernatant and thereby increasing the clarity and reducing the suspended solids of the supernatant which is returned to the flotation or other main separation step.

Generally, in the preferred embodiment, the well is formed in a lagoon that is already substantially filled with substantially solid clay sediment. Thus, by practicing the invention, a lagoon that has already been substantially filled with sediment can be given a new and very important purpose by excavating a treatment well and then relying on the existing sediment in the lagoon to provide a polishing of the supernatant. The rate of increase of sediment in the lagoon as a result of this polishing process is extremely slow and so the lagoon can be given an almost indefinite extension in its useful life.

The phrase "substantially full" means that the lagoon is too shallow to be useful for separation of clear supernatant from sediment, for instance as a result of the horizontal component of the flow velocity exceeding the vertical component of the settling rate.

Suitable dimensions for the well in the inventive process comprise a depth of from about 6 to about 30, preferably about 8 to about 20, feet and an upper surface area (generally approximating a square or round area) giving a flow rate of 0.01 to 1, preferably 0.1 to 0.5 U.S. gallons per minute per square foot. Typically the surface area is $10^4$ to $10_7$ square feet.

The size of a conventional primary lagoon is from about 50 to about 2000, generally 250 to 1000, acres. The distance of travel of the supernatant over the substantially solid clay sediment in the primary lagoon is generally at least 300 feet and usually at least 700 feet, e.g., 1000 to 5000 feet. The flow conditions of the supernatant as it travels from the well overflow to the primary lagoon exit are preferably such as to cause minimum disturbance of clay which is sedimenting down onto the substantially solid clay sediment in the base of the lagoon. Preferably the depth of the supernatant above the settling clay and the solid clay sediment is such that there is a layer of at least about 6 inches, generally at least about 1 foot and preferably at least about 3 feet deep which appears, to the naked eye, to be clear. The speed of flow of the supernatant is generally in the range of about 0.000001 to 0.1 gallons per minute per square foot, so as to promote the opportunity of sedimentation and to minimize the risk of disturbing the sedimenting clay.

The dilute aqueous clay waste is flocculated in the well by mixing a polymeric flocculant into the waste. The polymeric flocculant can be added in solid form but more usually is added as a preformed solution in conventional manner, typically having a polymer concentration of about 0.1–2% by weight. The polymeric flocculant can be added to the waste after the waste has entered the well but usually it is added to the waste before the waste enters the well. The addition point can be just prior to the entry to the well or it can be at a substantially earlier position, for instance as described in U.S. Pat. No. 5,688,404.

Generally the polymeric flocculant is added to the waste as it flows through a mixing device which discharges into the well. The mixing device can be a duct through which the waste flows with sufficient turbulence to promote good mixing of the flocculant into the waste. The turbulence may be generated solely by the rate of flow through the duct or by baffles or other turbulence inducers by the injection of water within the duct. If desired, mechanical rotors or other mechanical mixing apparatus can be provided to achieve suitable mixing of the polymeric flocculant into the waste, sufficient to give substantially uniform flocculation.

The polymeric floccuIent can be any water soluble polymeric flocculant which is capable of promoting flocculation and therefore separation of the aqueous waste into a supernatant and a thickened clay sediment. The polymer is generally a water soluble polymer formed from one or more ethylenically unsaturated monomers. The monomers may be non-ionic, anionic or cationic. Similarly, the polymer may be non-ionic, anionic or cationic, or it may be amphoteric.

Suitable anionic monomers include ethylenically unsaturated carboxylic or sulphonic monomers such as aryclic acid, methacrylic acid and 2-acrylamido-2-methyl propanesulfonic acid (AMPS) (a US trademark of the Lubrizol Corporation). Acrylamide is a suitable non-ionic monomer. Suitable cationic monomers are dialkylaminoalkyl (meth) -acrylates and -acrylamides, usually as their quaternary ammonium or acid addition salts, or diallyl dimethyl ammonium chloride.

Preferred anionic polymers are copolymers of 5–70% by weight generally 10–50% by weight anionic monomers such as acrylic acid (usually as sodium acrylate) and/or AMPS with other monomers generally acrylamide. Particularly preferred anionic copolymers are Percol 336, Percol 727, Percol 358 all from Ciba Specialty Chemicals, Water Treatments Inc. Suitable cationic polymers are formed of 1–50% by weight, generally 2–15% by weight cationic monomer such as dimethyl aminoethyl-acrylate or -methacrylate acid additions or quaternary salts together with other monomers, generally acrylamide. Particularly preferred cationic copolymers are Percol 455, Percol 352, also from Ciba Specialty Chemicals, Water Treatments Inc.

The molecular weight of the polymer is generally such that the polymer has an intrinsic viscosity ("IV") (measured using a suspended level viscometer, 1N sodium chloride buffered to pH 7 at 20° C.) of at least 4 dl/g and usually at least 8 dl/g. When the polymer is anionic, the IV is typically 10–30 dl/g and when it is cationic the IV is typically 8–15 dl/g.

The polymer can made by gel polymerization, reverse phase bead polymerization or reverse phase emulsion polymerization or by any other suitable technique in known manner.

Although much of the prior art emphasizes the use on phosphate slimes of anionic polymers, the separation process of the invention is generally conducted best by using a cationic polymer, for instance of the type described above. This polymer selection gives the best combination of clarity of the supernatant and thickening of the sediment. However an anionic polymer, generally of type described above, is usually preferred when the waste includes material from a flotation stage which has been promoted by the use of amine flotation agents preceded by treatment of the mineral with sulfuric acid to strip cationic material from the rock.

The effective dosage of the polymer is selected in conventional manner for sedimentation applications and is usually 0.1 to 1, preferably about 0.25 to about 0.75 pounds polymer per ton solids in the waste which is being flocculated.

The selection of the polymer and dosage amount can be conducted by conventional selection procedures so as to obtain the optimum combination of clarity and depth of supernatant and the rate of settling on the one hand and pumpable thickened clay sediment on the other.

The theoretical residence time of the dilute aqueous clay waste in the well is usually from 5 minutes to 2 hours, preferably 10 minutes to an hour, e.g., 15 to 40 minutes.

Promotion of the flocculation process can be achieved by mixing dilution water with the flocculant solution into the dilute aqueous clay waste because the waste entering the well often has a solids content above the value which gives optimum settling rate. The optimum amount of dilution water can be determined by routine testing.

The thickened clay sediment is removed from the well at a position significantly below the supernatant and/or at a time such that removal does not undesirably impair the quality of the supernatant. The removal may be continuous or discontinuous. The solids -content of sediment will generally increase towards the bottom of the well and, in order to minimize the risk of the well gradually filling up with sediment, it is therefore desirable to remove the thickened clay sediment from as close to the bottom of the well as possible.

The sediment that is removed from the well generally has a solids content at least 2 or 3 times and often up to 10 times the solids content of the original dilute aqueous clay waste stream which is being flocculated. Often the solids content of the thickened sediment is from about 10 to about 30% dry weight solids. Measured by taking a sample of the thickened sediment of known weight and evaporating the liquid component or moisture at a known temperature (typically 105 degrees Celsius) in a standard laboratory drying. The solids content should preferably be as high as is practicable but must not be so high that the sediment is not conveniently pumpable.

Removal can preferably be accomplished by pumping, such as by using a fixed pump positioned on the ground near the side of the well and connected by a pipe to near the base of the well for drawing off thickened sediment from the well, or a floating pump which floats on the supernatant and has a pipe extending down to near the base of the well.

The thickened sediment is removed from the well to one or more final lagoons where it is spread over the lagoon and allowed to sediment and evaporate to form the desired final substantially solid clay sediment. Because the thickened sediment removed from the well has a much higher solids content than conventional clay waste, the amount of sedimentation and evaporation which is required to provide the final solid sediment is much less than in conventional processes, and there may be no incentive to try to recycle any supernatant (because of the large amount of supernatant which has been recycled from the well). Accordingly the final one or more lagoons do not have to have as deep a settling volume as is normally considered necessary. As a result, the thickened sediment can be pumped into lagoons which are partially or almost entirely full of sediment.

The invention thus the advantage that it can simultaneously give good recovery of supernatant (often of very high clarity) while using lagoons which would normally be considered to be too full and to shallow for many purposes.

The following are examples of the invention.

EXAMPLE 1

A phosphate recovery process is conducted by slurring phosphate rock with water and separating the rock by physical screening and cycloning operations to give a coarse fraction and finer fractions. These finer fractions are subjected to further separations (including flotation) to give phosphate fractions and as aqueous clay waste having a solids content which varies between about 0.2% solids and 1% solids and which contains a small amount (typically 0.05 to 0.1%) solids of phosphate mineral values.

This waste is pumped through a ditch to a first lagoon having an area of about 250 acres. The waste travels into the lagoon at a velocity of about 10 feet per second, which drops to about 1 foot per second on entry to the lagoon, with consequent sedimentation of phosphate particles as the slurry enters the lagoon. The sedimented phosphate particles are removed from the base of the lagoon from time to time.

The resulting waste stream flows across the first lagoon that is separated by a dam from a second lagoon of about 250 acres which contains a significant depth of solid clay sediment and in which a substantially square well has been excavated with a length of about 100 feet on each side and a depth of about 15 feet.

Two pipes each having a diameter of about 3 feet extend through the dam. The aqueous slurry exiting the first lagoon flows through the pipes turbulently and discharges into the well. Throughout most or all of the flow time within the pipes a 0.5% solution of polymeric flocculant is injected into the waste as it enters the pipes and mixing in the pipes is enhanced by injection of dilution water under moderate pressure (typically about 50 psi) thereby creating significant turbulence through the pipes. Accordingly, flocculation of the clay is well advanced by the time the clay waste enters the well.

Within a hour of feeding the aqueous slurry into the well, sedimentation produces a clear supernatant and a thickened sediment having a solids content which is often 5–15 times the solids content of the solid waste, and within 24 hours sedimentation produces a sediment which is typically 20–50 times the solids content of the initial aqueous slurry.

For instance, in one process utilizing Percol 455 a cationic copolymer of 95% acrylamide 5% dimethylaminoethyl acrylate quaternized with methyl chloride having an intrinsic viscosity above 6 dl/g as the flocculant, the aqueous slurry entering the well had a solids content of 0.25%, after 1 hour the sediment had a solids content 7.9% and after 24 hours the sediment had a solids content of 13.2%.

Clear supernatant flows continuously from the well and across the second lagoon to a take off ditch positioned about 3000 feet from the well.

The resulting supernatant visually appeared clear and it was found that the costs of the main separation stage, and in particular the costs of flotation materials, was greatly reduced compared to the costs required when the supernatant was generated merely by conventional settling of the waste in a lagoon with recycling of the waste.

EXAMPLE 2

A slurried phosphate rock is separated from the waste clay and other waste materials by physical screening and cycloning operations to remove the coarsest product fraction. The finer fractions are then subjected to additional preparation operations to liberate all recoverable phosphate values from the waste fractions. The remaining phosphate values are further enriched by selective flotation operation. The processing operation at another operation was such that significant or excess amine reagents were delivered to a settling lagoon.

The settling lagoon led through a pipe into a well in a second lagoon and polymer was added, all broadly as described in Example 1.

The polymer that was used in this example was Percol 336, which is an anionic copolymer of 69% acrylamide and 31% sodium acrylate and having an intrinsic viscosity above 10 dl/g. This selected copolymer flocculant gave good results despite the presence of excess amine in the aqueous clay waste stream delivered to the well.

What is claimed is:

1. A mineral recovery process comprising a main separation stage of which mineral is slurried with water and separated into an enriched fraction and a dilute aqueous clay waste, and a waste sedimentation stage in which the dilute aqueous clay waste is sedimented in one or more settling lagoons to provide a substantially solid clay sediment and supernatant, and in which the waste sedimentation stage comprises feeding the dilute aqueous clay waste into a well, flocculating the dilute aqueous waste by mixing a polymeric flocculant into the dilute aqueous clay waste, sedimenting the flocculated dilute aqueous clay waste to provide a pumpable thickened clay sediment layer in the well and a supernatant layer, recycling the supernatant layer from the well back to the main separation stage.

2. A process according to claim 1 further comprising the step of removing at least a portion of the thickened clay sediment layer from the well, and allowing the removed thicken clay sediment to undergo further sedimentation and evaporation to provide a substantially solid clay sediment in one or more final lagoons.

3. A process according to claim 1 in which the well has been dug in a primary lagoon which contains substantially solid clay sediment from the mineral recovery process.

4. A process according to claim 3 in which the supernatant flows over the substantially solid clay sediment in the primary lagoon before being recycled to the main separation stage.

5. A process according to claim 1 in which the main separation stage includes at least one flotation stage and the recycling of the supernatant includes recycling to at least one flotation stage.

6. A process according to claim 1 in which the thickened clay sediment layer has a solids content 5 to 100 times the solids content of the dilute aqueous clay waste.

7. A process according to claim 1 in which the dilute aqueous clay waste has a solids content of 0.1–7% and the thickened clay sediment layer has a solids content of 10–30%.

8. A process according to claim 4 in which the primary lagoon is substantially filled with a substantially solid clay sediment from the mineral recovery process.

9. A process according to claim 2 in which the one or more settling lagoons and the one or more final lagoons are substantially filled with a substantially solid clay sediment from the mineral recovery process.

10. A process according to claim 1 in which the dilute aqueous clay waste contains particulate mineral values that are sedimented from the dilute aqueous clay waste before the dilute aqueous clay waste is fed into the well.

11. A process according to claim 1 in which the mineral recovery process is a phosphate recovery process.

12. A process according to claim 11 in which the flocculant is a water soluble cationic polymer having an intrinsic viscosity of at least 4 dl/g.

13. A process according to claim 11 in which the main separation stage comprises a flotation stage utilizing an amine flotation agent and the dilute aqueous clay waste is treated with mineral acid, and the flocculant is a water soluble anionic polymer.

* * * * *